July 6, 1965

W. B. CRANE 3,193,082

WEIGHING CONVEYOR

Filed April 25, 1961

INVENTOR.
WALTON B. CRANE
BY Lilly & Nyhagen
Attorneys

July 6, 1965

W. B. CRANE 3,193,082

WEIGHING CONVEYOR

Filed April 25, 1961

INVENTOR.
WALTON B. CRANE
BY Lilly & Nyhagen
Attorneys

July 6, 1965 W. B. CRANE 3,193,082
WEIGHING CONVEYOR
Filed April 25, 1961 4 Sheets-Sheet 3

INVENTOR.
WALTON B. CRANE
BY Lilly & Nyhagen
Attorneys

July 6, 1965 W. B. CRANE 3,193,082
WEIGHING CONVEYOR
Filed April 25, 1961 4 Sheets-Sheet 4

INVENTOR.
WALTON B. CRANE
BY Lilly & Nyhagen
Attorneys

United States Patent Office 3,193,082
Patented July 6, 1965

3,193,082
WEIGHING CONVEYOR
Walton B. Crane, South Pasadena, Calif., assignor to Allied Plastics Company, Los Angeles, Calif., a corporation of California
Filed Apr. 25, 1961, Ser. No. 105,322
7 Claims. (Cl. 198—39)

This invention deals generally with packaging machines and, more particularly, with a machine for use in packaging articles in baskets.

The invention will be described with reference to one specific application thereof, namely, packaging articles of fruit, such as grapes, cherries, or the like, in plastic fruit baskets. It will become clear as the description proceeds, however, that this application is purely illustrative and not limiting in nature.

In prior application Serial No. 809,391 filed April 28, 1959, by Harry G. Long et al. for Wrapper for Packaged Produce, now Patent No. 3,040,968 issued June 26, 1962, there is disclosed a unique fruit package consisting of a slit transparent sheet which is wrapped about the packaged fruit, and a plastic fruit basket containing the fruit and its transparent wrapper in such a way that the corners of the wrapper are at the bottom of the basket underneath the fruit.

Prior application Serial No. 831,116 filed August 3, 1959, by Walton B. Crane for Produce Basket Filling Device, now Patent No. 3,054,238 issued September 18, 1962, discloses a basket filling device for assembling this fruit package by a method involving the placement of the slit transparent fruit wrapper over the mouth of a cup, placing the fruit to be packaged on the wrapper so that the fruit and center of the wrapper sink into the cup, joining the ends of the wrapper over the fruit, placing a fruit basket in an inverted position on the mouth of the cup, and inverting the cup so that the produce and its encompassing wrapper drop into the basket, joined corners first. This prior device is essentially manual and intermittent in operation. Obviously, articles of produce other than fruit may be packaged in this way.

A general object of this invention is to provide a semi-automatic machine for use in packaging articles of produce in the manner described.

Another object of the invention is to provide a packaging machine of the character described which achieves a continuous, rather than an intermittent, packaging operation, whereby the packaging rate is substantially increased.

Yet another object of the invention is to provide a packaging machine of the character described which has provision for checking the weight of the produce packaged in each produce basket without interrupting the continuous operation of the machine.

A further object of the invention is to provide a packaging machine of the character described which delivers the finished produce packages to a convenient collection point.

Yet a further object of the invention is to provide a packaging machine of the character described which is relatively simple in construction and operation, relatively inexpensive to manufacture, and otherwise ideally suited to its intended purposes.

Other objects, advantages, and features of the invention will become readily apparent as the description proceeds.

Briefly, these objects are attained by providing a packaging machine equipped with a frame, an endless conveyor member on the frame having approximately horizontal upper and lower runs, and cups attached to this conveyor member which open upwardly when on the upper run of the conveyor member and are inverted by movement to the lower run.

While on the upper run, a slit wrapper is placed across the mouth of each cup and a predetermined quantity of the produce to be packaged is then placed on the wrapper, after which the corners of the wrapper are joined over the produce. An inverted produce basket is then placed over the cup. As each filled cup moves onto the lower run of the conveyor member, its respective produce basket drops from the inverted cup in an upright position and with the wrapper-encompassed produce therein. A conveyor receives each basket as it drops and carries the same to a convenient collection point.

One of the important features of the invention resides in a unique scale arrangement for checking the weight of the contents of each filled cup as the latter travels along the upper run and prior to the cup receiving an inverted basket. In this way, each cup may be provided with the correct amount of produce so that each finished produce basket will have the correct weight.

The invention will be best understood from the following detailed description of the present illustrative embodiment thereof, taken in connection with the attached drawings, wherein:

FIG. 1 is a side elevation of the present packaging machine;

FIG. 2 diagrammatically illustrates the conveyor system of the machine;

Figure 1:
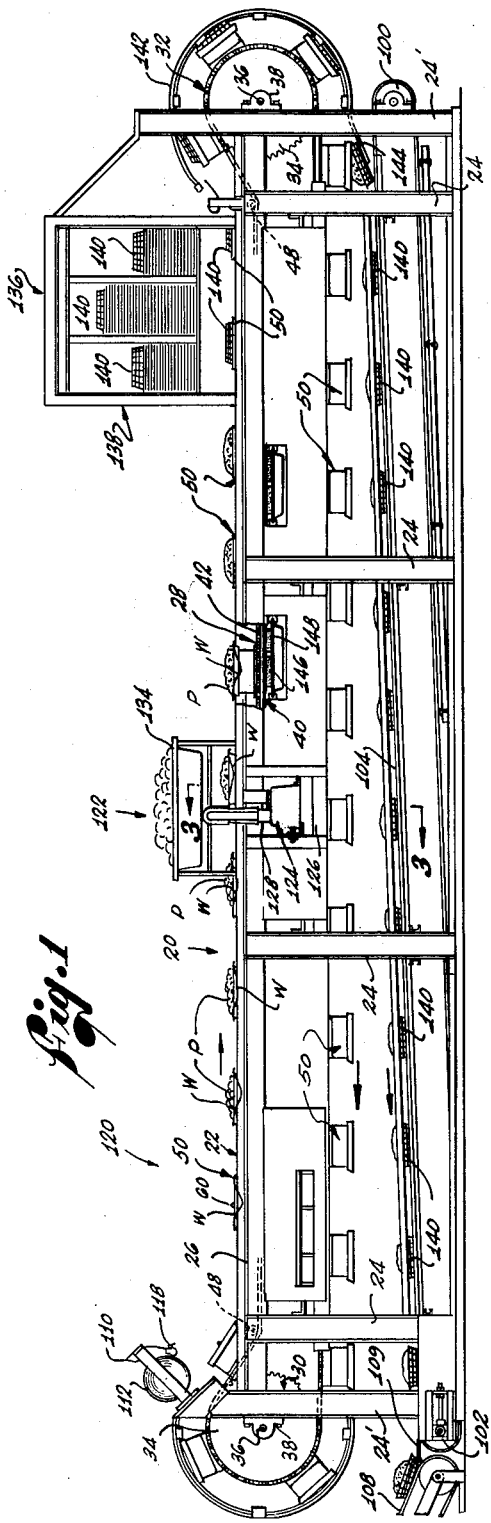

The packaging machine 20 illustrated in these drawings is equipped with a long, narrow frame 22. This frame consists of vertical supporting legs 24, longitudinal frame members 26, and cross frame members (not shown) all joined into a rigid frame structure.

On this frame is a conveyor means 28 including two sprocket wheel sets 30 and 32 located at opposite ends and adjacent the top of the frame. Each sprocket wheel set is made up of two large, axially spaced sprocket wheels 34 (only the near wheel in each set is visible) keyed on an axle 36. Axles 36 are rotatably supported by bearings 38 attached to end legs 24' of the frame so that the sprocket wheel sets have axes of rotation which are parallel, horizontal, and extend crosswise of the frame.

Figure 2:
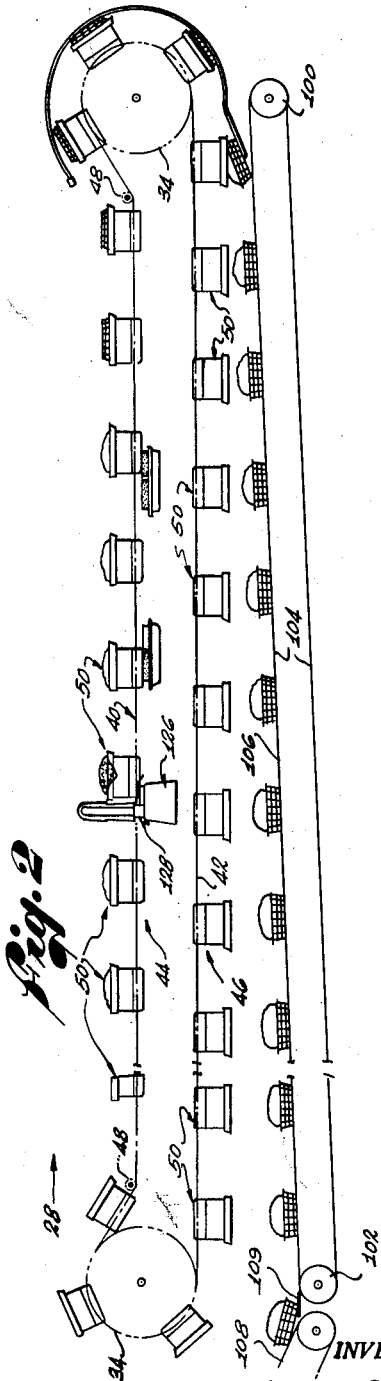

Trained about the sprocket wheel sets is an endless conveyor member 40 consisting of two sprocket chains 42 (FIG. 5) which are trained about corresponding sprockets 34, as shown best in the diagrammatic illustration of FIG. 2. The conveyor member 40 will be seen to have an upper, approximately horizontal run 44 and a lower, approximately horizontal run 46. The sprocket chains 42 in the upper run 44 of the conveyor member 40 pass under pairs of small guide sprockets 48. These guide sprockets are provided to reduce the spacing between the upper and lower runs so as to permit the use of large, main conveyor sprockets 34, which is necessary for reasons to be seen, without making the machine excessively high.

Attached to the conveyor member 40 at positions spaced therealong and to the side of the member which is uppermost in the upper run 44 thereof are a plurality of identical article carriers or packaging cups 50, hereinafter referred to simply as cups. Since the cups are identical, only one will be described in detail by reference to FIGS. 3–5. As shown, the cup opens outwardly away from the conveyor member 40 and consists of a generally rectangular, sheet metal structure having side walls 52, end walls 53, and a bottom wall 54. The upper portions of the side walls are formed, as shown, to provide the cup with an internal, outwardly facing shoulder or seat 56 and a flared rim 58. Fixed to and extending beyond this rim, at opposite sides of the cup, are two prongs 60.

Figure 3:
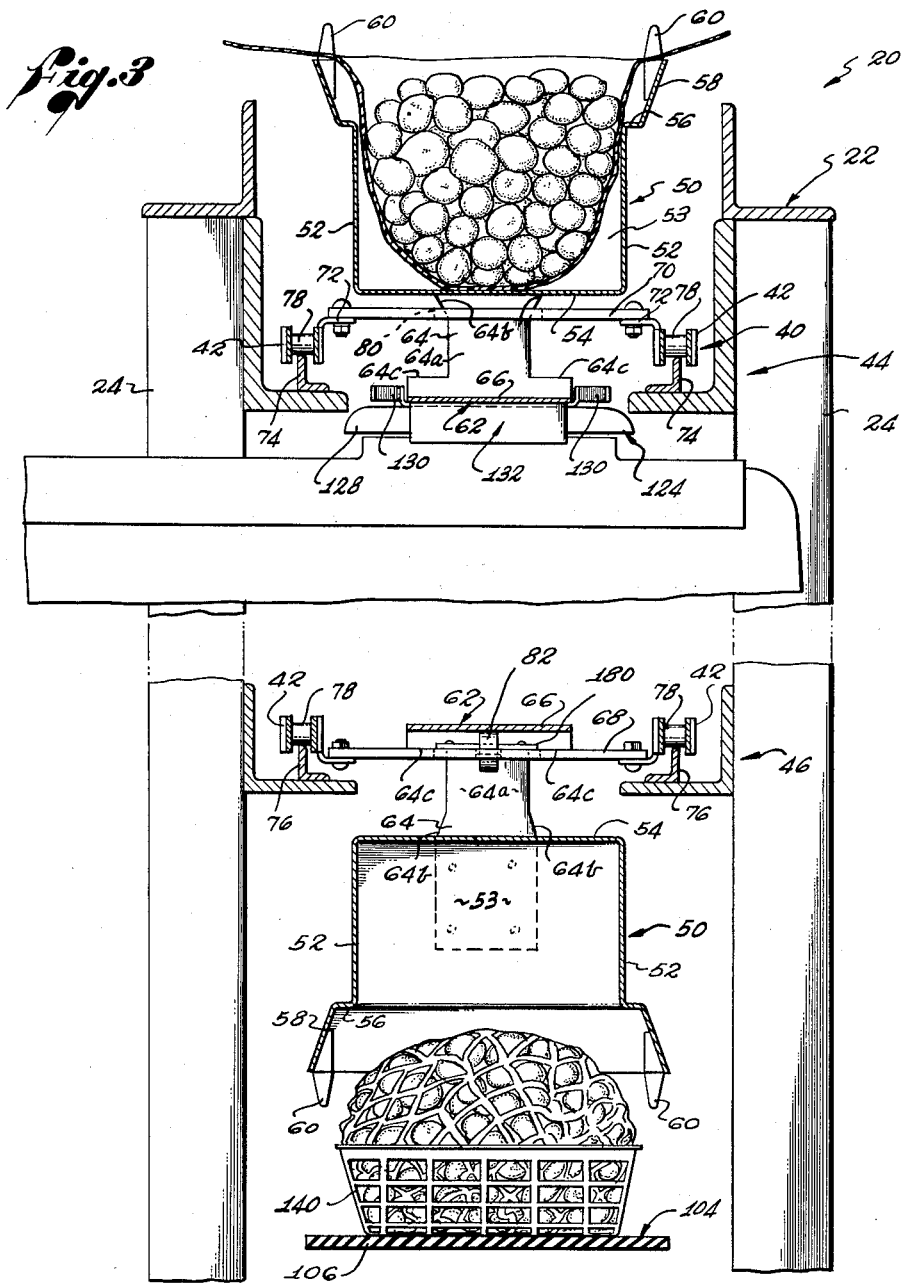
FIG. 3 is an enlarged section taken along line 3—3 on FIG. 1.
Figure 4:
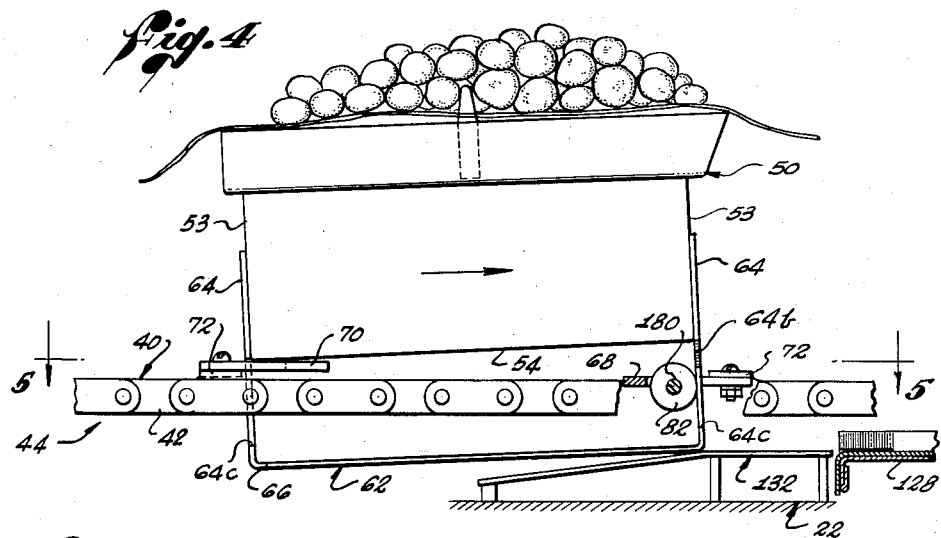
FIG. 4 is an enlarged side elevation of one of the packaging cups of the machine shown approaching the scale which weighs the cup contents.

Straddling the bottom of the cup, as the latter is viewed in FIG. 4, is a generally U-shaped bracket 62. The legs 64 of this bracket are spot welded or otherwise rigidly joined to the side walls 53 of the cup which are its front and rear side walls with respect to its direction of motion, indicated by the arrow. The connecting portion 66 of the bracket 62 is spaced some distance from and parallels the bottom wall 54 of the cup. As shown best in FIG. 3, the side edges of the bracket legs 64 are relieved or notched so that the center portion 64a of each leg is quite narrow relative to the width of the connection portion 66 of the bracket. Adjacent the cup 50, the side edges of the bracket legs flare outwardly, as shown at 64b. Adjacent the connecting portion 66 of the bracket, the bracket legs define transverse shoulder edges 64c.

Figure 5:
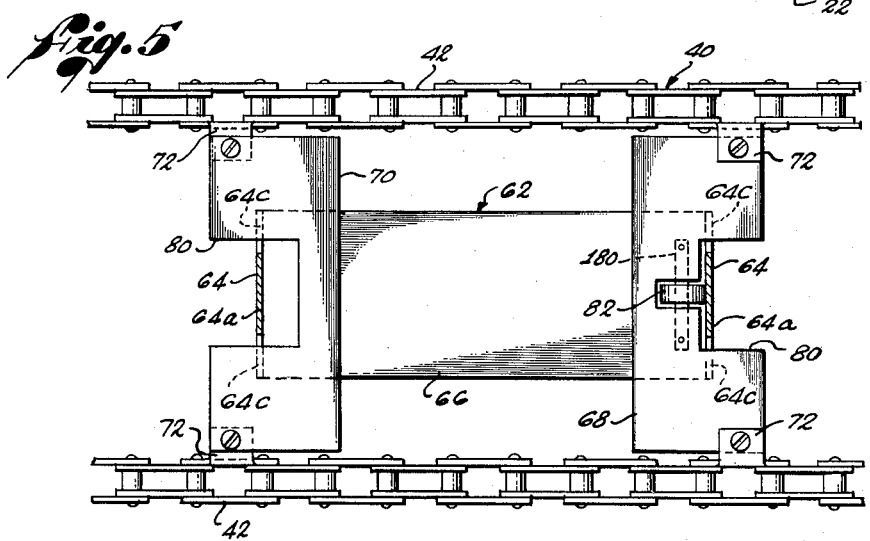
FIG. 5 is a section taken along line 5—5 in FIG. 4.

Extending between transversely aligned links of the conveyor chains 42, opposite each cup, are a pair of cross plates 68 and 70 (FIG. 5). These cross plates are attached at their ends to the adjacent aligned chain links by being bolted to inwardly extending tabs 72 on the links. Thus, the two conveyor chains are joined at intervals to form the unitary endless conveyor member 40. With respect to the direction of conveyor chain travel indicated by the arrow in FIG. 4, cross plate 68 of each plate pair is the leading plate and cross plate 70 is the trailing plate.

Rigidly fastened to the frame 22 of the machine are upper and lower, longitudinally extending channels 74 and 76 (FIG. 3) on which rollers 78 of the conveyor chains rest. These channels form tracks which support and guide the upper and lower runs of the unitary conveyor member 40.

As shown best in FIG. 5, the leading edge of cross plate 68 and the trailing edge of cross plate 70 of each plate pair are formed with rectangular notches 80 through which the legs 64 of the respective cup bracket 62 extend. The spacing between the bracket legs is somewhat greater than the spacing between the bottom edges of the slots 80 in the cross plates, and the width of the slots is somewhat greater than the width of the narrow center portions 64a of the bracket legs.

The cups 50 on the upper run 44 of the conveyor member 40 normally rest on their respective cross plates 68 and 70. In this position, the flared ends 64b of the bracket legs 64 on each cup enter the slots 80 in the respective cross plates and center the cup in the transverse direction of the conveyor chains. When each cup is elevated to the position shown in the upper half of FIG. 3, as it is during a weighing operation to be shortly explained, the narrow portions 64a of its respective bracket legs 64 enter the slots 80 of their respective cross plates 68, 70. In this elevated position of a cup, the side edges of its bracket legs clear the sides of the respective cross plate slots 80. The bracket legs 64 on each cup are also kept clear of the bottom edges of their respective cross plate slots by means of a bearing roller 82 which is rotatably supported on the leading cross plate 68 and bears against the trailing side of the leading bracket leg 64. The bracket leg 64 on each cup 50 and its respective conveyor roller 82 provide cooperating drive means on the conveyor and cup which transmits driving thrust from the conveyor to the cup while accommodating free vertical floating movement of the cup relative to the conveyor. The roller, then, serves as a drive roller and the rear surface of the bracket leg 64 serves as a drive surface against which the roller pushes to drive the respective cup.

From the above description, it is evident that the bracket and cross plate arrangement associated with each cup provides, in effect, a floating connection between the respective cup and conveyor member 40 which renders each cup free to move or float a limited distance in the vertical direction with respect to the conveyor member. Also, when the cups on the upper run 44 of the conveyor member are in their normal positions wherein they rest on their respective conveyor chain cross plates 68, 70, the cups are centered in the transverse direction of the conveyor chains. When a cup on the upper run is in its elevated position, shown in the upper half of FIG. 3, the cup is substantially disengaged from the conveyor member 40, the only contact being at the respective bearing roller 82. This roller, of course, does not impose an appreciable resistance to vertical floating movement of the cup.

The cups on the lower run 46 of the conveyor member hang below the latter in the manner illustrated in the lower half of FIG. 3. In this position, transverse shoulder edges 64c on the bracket legs 64 of each cup rest on the then upper sides of their respective conveyor chain cross plates 68, 70.

Figure 7:
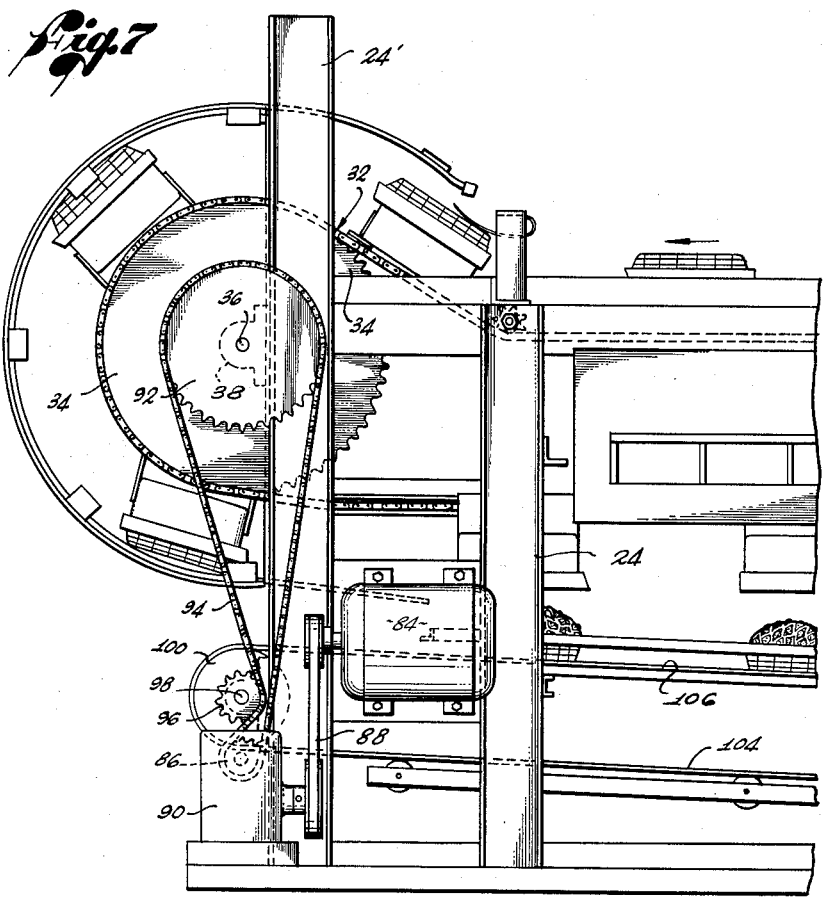
FIG. 7 is an enlarged rear view of the right-hand end of the machine in FIG. 1.
Figure 8:
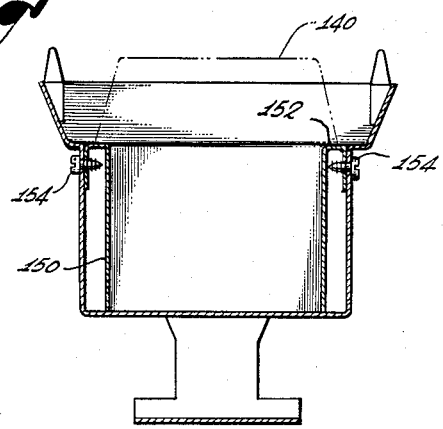
FIG. 8 illustrates a packaging cup having an insert to change the volume of the cup.

The conveyor member 40 is driven, to feed the cups 50 in the direction indicated in the drawings, by a main drive motor 84 mounted on the right end of the machine frame 22, as best shown in FIG. 7. Motor 84 is positioned with its rotor horizontal and drives a sprocket 86 through a belt drive 88 and a reduction gear unit 90. Trained about sprocket 86 and a larger sprocket 92 keyed on the right-hand sprocket wheel shaft 36 is a sprocket chain 94. Accordingly, the right-hand sprocket wheels 34 are driven at a reduced speed by the motor 84 to operate the endless conveyor member 40 and feed the cups 50 in the direction indicated.

Sprocket chain 94 passes in driving contact with a sprocket wheel 96 keyed on a shaft 98. This shaft is rotatably supported on the machine frame 22 and fixedly mounts a drum 100. Trained about this drum and a drum 102 rotatably supported on the remote end of the frame is a second conveyor member or belt 104. This belt is disposed below the lower run 46 of the upper conveyor member 40 and slopes down slightly toward the left-hand end of the machine as it is viewed in FIGS. 1 and 2. The upper run 106 of this belt moves in the same direction as the lower run of the upper conveyor member and toward said left-hand end of the machine.

Opposite this end of the frame is a separate, upwardly inclined conveyor 108. Between conveyor belt 104 and conveyor 108 is a metal bridge plate 109 whereby articles are adapted to feed from the conveyor belt 104 onto the conveyor 108.

Figure 6:
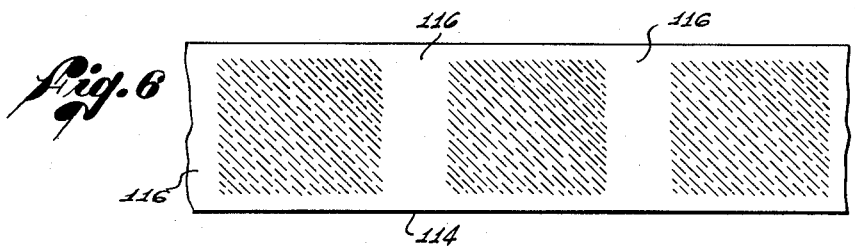
FIG. 6 illustrates a strip of the slit wrappers which are used with the machine.

As mentioned earlier, the packaging procedure carried out with the present machine involves the use of a slit plastic sheet or wrapper of the character disclosed in Patent No. 3,040,968. Mounted on an upstanding support 110 on the left-hand end of the machine frame is a roll 112 of said wrappers in continuous strip form. That is to say, a strip 114 of thin, plastic sheet material is slit at intervals in the manner shown in FIG. 6. Between the slit portions of the strip are unslit cross bands 116. Also mounted on the roll support 110 is a hot wire means 118 by which an individual wrapper may be "torn" from the strip along a line bisecting one of the unslit bands 116 of the strip.

During operation of the machine, a first packer, standing at a first packer's station 120, tears a split wrapper W from the roll 112 and places the wrapper across the mouth of each cup 50, as the latter moves past the station 120 on the upper run 44 of the conveyor member 40. This is done in such a way that the prongs 60 on each cup are inserted through slits in the wrapper, in precisely the same way explained in Patent No. 3,054,238. This packer then grabs a quantity of the produce P being packaged from a convenient storage bin (not shown) and places the same on the center of the wrapper which the packer has just placed over the mouth of a cup passing the station 120. The center of the wrapper stretches under the weight of the produce so that the latter sinks into and fills the cup.

Following the first packer's station 120 is a weighing station 122 at which the contents of each cup is checked for correct weight. At this weighing station is a scale 124 which is supported on a platform 126 on the machine frame 20. Scale 124 includes a weighing platform 128 located below the upper run 44 of the conveyor member 40. During movement of the cups 50 along the upper run 44 of the conveyor member 40, therefore, they travel across the scale platform 128. As shown best in FIG. 3, this platform is at such a height that it holds each cup in its elevated position as the respective cup travels over the scale platform. It will be recalled that in this elevated position of each cup, the latter is substantially disengaged from the conveyor member 40 and floats free. As a result, the entire weight of each cup and its contents will act on the scale. The scale, however, is calibrated to indicate only the weight of the cup contents, all of the cups of the machine being equally weighted for this purpose.

In order to guide each cup over the scale platform, the latter is provided with upstanding guides 130 (FIG. 3) between which the connecting portion 66 of the respective cup bracket 64 moves to center the cup on the scale platform. The entrance end of these guides diverge, as shown, to lead the cup bracket into the guideway between the guides. These guides are required, of course, since in the elevated position of each cup 50, its bracket legs clear the respective conveyor chain cross plates and the cup would be free to move sideways from the center of the scale platform if not guided.

Just ahead of the scale platform is a ramp structure 132 (FIG. 4) which elevates each cup 50 to the level of the scale platform, just before the respective cup reaches the platform. During this elevation of each cup, its leading bracket leg 64 rides on its bearing roller 82. In this way, any binding or frictional forces which would otherwise restrain or prevent upward camming of the cups by the ramp 132 are eliminated.

At the weighing station 122 is a bin 134 containing a supply of the produce being packaged. During operation of the machine, a packer standing at the weighing station takes produce from the bin and places it in a cup 50 as the latter passes over the scale platform or removes produce from the cup and returns it to the bin, as necessary to attain the correct weight, as indicated by the scale 124.

Following the weighing station 122 is a third packer's station 136. At this station is a rack 138 for holding a supply of the baskets 140 to be packed. As shown, each basket has the general shape of a truncated pyramid. A packer standing at this station first draws the corners of the wrapper W on each cup 50 passing the station together over the produce in the cup and joins these corners in any suitable way. The packer then takes a basket from the rack 138 and places it in an inverted position on the cup so that the rim of the basket seats on the cup shoulder 56.

Upon leaving the third packer's station 136, the cups 50 with their contents and the inverted baskets thereon move around the right-hand sprocket wheels 34 to the lower run 46 of the conveyor member 40. In this process, of course, each cup is inverted. Fixed on the machine frame 22 and extending concentrically about the sprocket wheels 34 is a cylindrically curved guide 142. This guide is spaced at just the correct radial distance from the sprocket wheels to hold each baskett 140 on its respective cup 50 during movement of the latter around the wheels.

Extending from the lower end of the guide 142 is a spring leaf 144 along which each basket rides upon emerging from the guide. Thus, each cup 50 emerges from the guide 142 in an inverted position, as already noted, so that the basket 140 thereon tends to drop, in an upright position, from the cup with the produce and its enveloping wrapper in the basket. The spring leaf 144 guides each basket, thus dropping from its cup, onto the lower conveyor belt 104 which then conveys the upright basket, with its contained produce and wrapper, to the collection point at the left-hand end of the machine in FIG. 1. From this point, the baskets feed onto the outfeed conveyor 108 for further weighing, handling, and packing.

After being emptied of its contents on the lower run 46 of the conveyor member 40, each cup 50 returns to the upper run for refilling.

In order to prevent the connecting portions 66 of the cup brackets from accumulating deposits of foreign matter during passage through the machine, each cup passes over a wet absorbent pad 146 and a dry absorbent pad 148 which wipe the brackets clean.

Produce baskets, such as fruit baskets, are made in various sizes. In order to adapt the machine to use with these different basket sizes, each cup 50 may be furnished with a removable insert 150 for adjusting the effective volume of the cup and providing a suitable shoulder 152 for seating a particular basket rim. Thus, each cup may be adjusted in effective size by replacing one sized insert with another sized insert or by completely removing the insert. The insert is releasably attached to the cup by screws 154.

It will be obvious, of course, that while the illustrated cups 50 are rectangular, for receiving rectangular baskets, they could be of some other shape, such as round to receive a round basket. In the alternative, of course, the cup inserts might be made in various internal shapes for this purpose.

While the foregoing description has described the present machine as having three packer's stations, for the sake of simplicity, it is evident that the machine may have as many packer's stations therealong as are required for efficient operation. For example, packers may be located along the machine as follows: A first packer, adjacent the left end of the machine, as the latter is viewed in the drawings, for tearing the slit wrappers W from the roll 112 and placing the wrappers across the mouth of the cups 50 as the latter move past this packer, a second packer between this first packer and the weighing station 122 for placing the produce to be packaged in the cups, a third packer located at the weighing station 122 for checking the weight of the produce in each cup and adding to or withdrawing from each cup produce as required to achieve the correct weight, a fourth packer between the weighing station 122 and the final station 136 to close the wrappers about the produce in the cups, and a final fifth packer at station 136 for removing baskets from the dispensing rack 138 and placing these baskets in an inverted position over the produce in the cups.

Clearly, therefore, the invention herein described and illustrated is fully capable of attaining the objects and advantages preliminarily set forth.

Numerous modifications in the design, arrangement of parts, and instrumentalities of the invention are, of course, possible within the spirit and scope of the following claims.

What is claimed is:

1. In a packaging machine, the combination comprising:
   an elongate frame;
   a pair of substantially parallel, endless conveyor chains on said frame having substantially coplanar upper and lower runs extending lengthwise of and spaced transversely of said frame;
   sprockets rotatably mounted on the ends of said frame around which said conveyor chains are trained;

means for longitudinally driving said conveyor chains in unison in one direction;

plate means extending between and secured to said conveyor chains, said plate means having leading and trailing edges with respect to the direction of movement of said chains and openings therethrough adjacent said edges and midway between said chains;

one side of said plate means facing upwardly when said plate means are located on said upper runs of said conveyor chains;

a packing cup located opposite said one side of said plate means, said cup having leading and trailing ends with respect to the direction of movement of said chains and including a rigid bracket having legs secured to said cup ends, respectively, and extending loosely through said openings in said plate means and a relatively broad, generally flat connecting plate bridging said legs at the opposite side of said plate means, whereby said cup is adapted to float vertically with respect to said chains;

a weighing scale having a platform located beneath said upper runs of said conveyor chains in a position wherein said connecting plate portion of said cup bracket rides over said platform during movement of said cup along said upper runs; and said platform being vertically located to elevate said cup free of vertical supporting contact with said chains, whereby said cup is supported entirely by said platform during movement of the cup past said scale.

2. The subject matter of claim 1 wherein:
the end portions of said bracket legs adjacent said cup are wider than the respective openings in said plate means and the end portions of said legs adjacent said connecting plate are narrower than the respective openings in said plate means, whereby said legs clear said plate means when said cup is supported in elevated position by said scale platform and said wide portions of said legs are supported on said plate means when said cup is not supported on said scale platform.

3. The subject matter of claim 1 wherein:
the end portions of said bracket legs adjacent said cup are wider than the respective openings in said plate means and the end portions of said legs adjacent said connecting plate are narrower than the respective openings in said plate means, whereby said legs clear said plate means when said cup is supported in elevated position by said scale platform, and the edges of said wide portions of said legs are tapered where they join to said narrow end portions of said legs to engage the side edges of the respective openings in said plate means and thereby support and center said cup with respect to said conveyor chains while said cup is not supported on said scale platform.

4. In an article conveyor, the combination comprising:
a frame;
a conveyor member supported on said frame for movement along the frame;
a carrier member for supporting an article to be conveyed;
means mounting said carrier member on said conveyor member for vertical floating movement of said carrier member relative to said conveyor member;
cooperating drive means on said members for transmitting driving thrust from said conveyor member to said carrier member along a line of action parallel to the direction line of movement of said conveyor member including a drive surface on one member in a plane transverse to said direction line and a drive roller on the other member disposed in direct driving engagement with said drive surface, whereby said carrier member is driven by said conveyor member through said roller and drive surface and said carrier member is free to float vertically relative to said conveyor member during movement of said carrier member by said conveyor member;
a weighing scale on said frame having a weighing platform beneath said conveyor member;
said carrier member including means disposed for vertical supporting engagement with said scale platform during movement of said carrier member past said scale;
said scale platform being disposed to support said carrier member out of vertical supporting engagement with said conveyor member during movement of said carrier member over said scale platform, and said cooperating drive means minimizing the resistance to vertical floating movement of said carrier member relative to said conveyor member while the carrier member is being driven across said platform by said conveyor member, whereby said scale accurately responds to the combined weight of the carrier member and an article supported thereby during movement of the carrier member across said scale platform; and
means for guiding said platform engaging means of said carrier member onto said scale platform while said carrier member is being driven by said conveyor member.

5. The subject matter of claim 4 wherein:
said platform engaging means includes a drive leg extending through an opening in said conveyor member and having a surface presented in a direction opposite to the direction of movement of said conveyor member to form said drive surface; and
said roller being mounted on said conveyor member and engaging said rear leg surface.

6. In an article conveyor, the combination comprising:
a frame;
a conveyor supported on said frame for movement along the frame;
a carrier for supporting an article to be conveyed;
means mounting said carrier on said conveyor for movement of said carrier by said conveyor and free vertical floating movement of said carrier relative to said conveyor during movement of the carrier with the conveyor;
a weighing scale on said frame including a weighing platform disposed beneath said conveyor;
said carrier including a supporting member disposed for vertical supporting engagement with said scale platform during movement of said carrier past said scale;
said supporting member being normally disposed at a given elevation relative to said frame when said carrier is vertically supported by said conveyor and approaching said scale, and the normal elevation of said scale platform being above said given elevation, whereby said scale platform supports said carrier in an elevated position out of vertical supporting engagement with said conveyor and said scale accurately responds to the combined weight of said carrier and an article supported thereby during movement of said carrier over said scale platform; and
means on said frame immediately preceding said scale for elevating said supporting member to the normal elevation of said scale platform as said carrier approaches said scale, thereby to effect movement of said supporting member onto said scale platform.

7. In an article conveyor, the combination comprising:
a frame;
a conveyor supported on said frame for movement along the frame;
a carrier for supporting an article to be conveyed;
means mounting said carrier on said conveyor for movement of said carrier by said conveyor and free vertical floating movement of said carrier relative to said conveyor during movement of the carrier with the conveyor;

a weighing scale on said frame including a weighing platform disposed beneath said conveyor;

said carrier including a supporting member disposed for vertical supporting engagement with said scale platform during movement of said carrier past said scale;

said supporting member being normally disposed at a given elevation relative to said frame when said carrier is vertically supported by said conveyor and approaching said scale, and the normal elevation of said scale platform being above said given elevation, whereby said scale platform supports said carrier in an elevated position out of vertical supporting engagement with said conveyor and said scale accurately responds to the combined weight of said carrier and an article supported thereby during movement of said carrier over said scale platform; and an upwardly inclined ramp on said frame immediately preceding said scale for elevating said supporting member to the normal elevation of said scale platform as said carrier approaches said scale, thereby to effect movement of said supporting member onto said scale platform.

References Cited by the Examiner
UNITED STATES PATENTS

| | | | |
|---|---|---|---|
| 741,466 | 10/03 | Donnelly | 53—243 X |
| 2,359,786 | 10/44 | Peachy | 198—39 |
| 2,580,599 | 1/52 | Rogers | 53—392 X |
| 2,638,305 | 5/53 | Miller | 198—39 X |
| 2,683,557 | 7/54 | Jenney | 53—243 X |
| 2,905,310 | 9/59 | Stoeckel et al. | 198—39 |
| 3,054,238 | 9/62 | Crane | 53—392 |

FRANK E. BAILEY, *Primary Examiner.*

ROBERT A. LEIGHEY, *Examiner.*